DESLUDGING VALVE   CLOSED   WIDE   CLOSED
                              OPEN

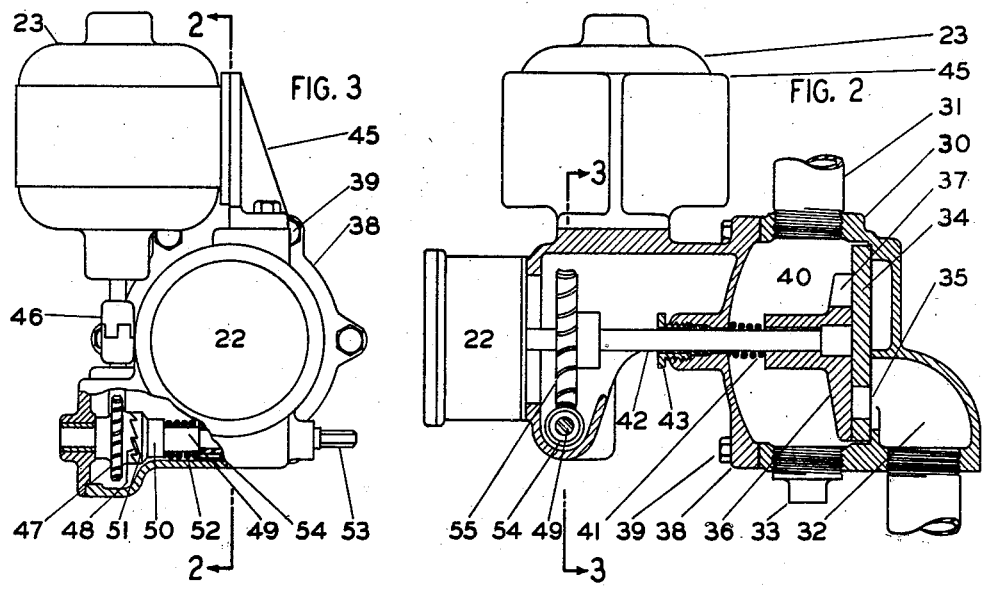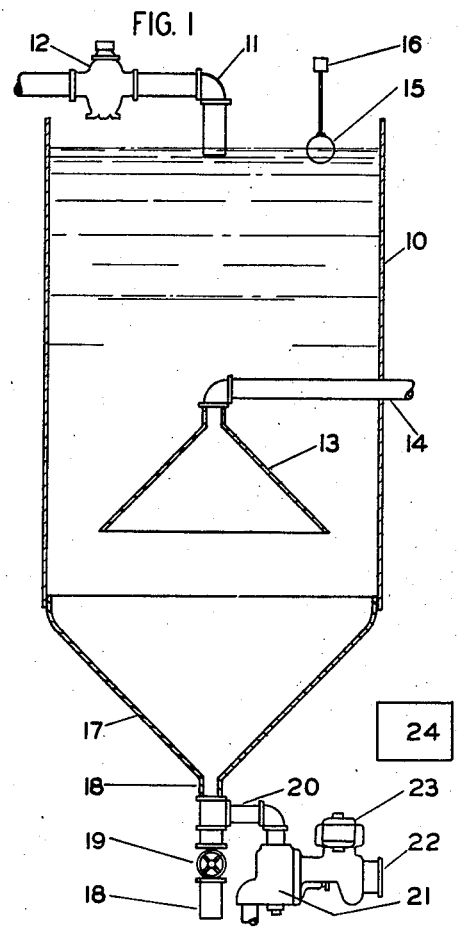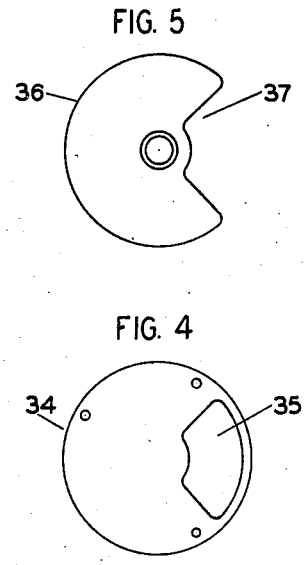

DESLUDGING VALVE   CLOSED   WIDE   CLOSED
                              OPEN

Patented Apr. 29, 1941

2,240,182

UNITED STATES PATENT OFFICE 2,240,182

APPARATUS FOR DESLUDGING SETTLING TANKS

Charles M. Guldner, Jr., Granite Springs, and Eric Pick, East Rockaway, N. Y., assignors to The Permutit Company, New York, N. Y., a corporation of Delaware Application July 1, 1939, Serial No. 282,410
In Great Britain August 29, 1938

8 Claims. (Cl. 210—16)

This invention relates to apparatus for desludging settling tanks.

In many processes turbid liquids are clarified by settling. In softening water by the addition of lime or lime and soda, for instance, fine precipitates are formed the bulk of which is removed by passing the water through a settling tank where the precipitates collect as a sludge which is drawn off periodically. When this desludging is done under haphazard manual control the operator may not desludge in time so that an excessive quantity of sludge accumulates in the settling tank with the result that appreciable quantities of precipitate remain in suspension and the effluent is not clear. On the other hand, the operator may not terminate desludging when all accumulated sludge has been removed so that treated water is wasted. Similar considerations apply to other processes involving the clarification of turbid liquids by settling.

The objects of our invention are, first, to provide an improved apparatus for initiating desludging at intervals when a predetermined quantity of sludge has accumulated; second, to terminate each desludging operation after a predetermined interval of time; third, to prevent desludging and unduly lowering the level of liquid in a settling tank when flow to the tank ceases.

The manner in which these objects are achieved is illustrated in the accompanying drawings, in which—

Fig. 1 is a diagrammatic showing of an apparatus embodying our invention;

Fig. 2 is a vertical section of the desludging valve of Fig. 1, taken along line 2—2 of Fig. 3 and showing the valve in closed position;

Fig. 3 is a front elevation of the desludging valve, partly in section along line 3—3 of Fig. 2;

Fig. 4 is a view of the portplate of the valve of Figs. 2 and 3;

Fig. 5 is a view of the rotor of the valve of Figs. 2 and 3;

Similar numerals refer to similar parts throughout the several views.

Figure 6:
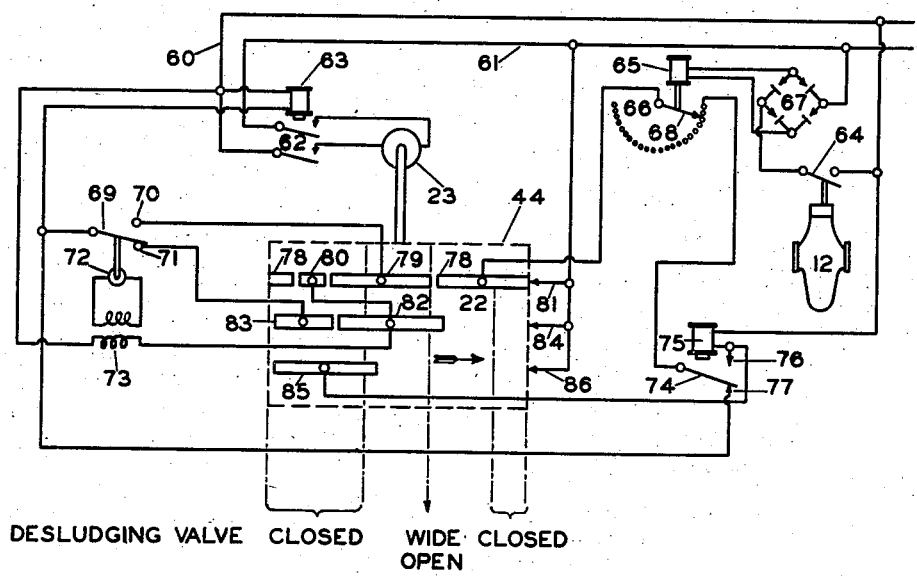
Fig. 6 is a wiring diagram for the apparatus illustrated in Fig. 1.

Referring now to Fig. 1, a settling tank 10 is provided with an inlet pipe 11 for turbid liquid. A meter 12 is located in pipe 11. A conical uptake 13 connects with outlet pipe 14 for settled liquid. Within tank 10 is a float 15 arranged to open a switch 16 when the liquid in tank 10 reaches a predetermined level, and to close switch 16 when the liquid drops below said level. The bottom 17 of tank 10 is of conical shape, and a sludge outlet pipe 18 provided with a manually operated valve 19 is connected to the bottom 17. A branch sludge outlet pipe 20 which may be of smaller size than pipe 18 is connected to pipe 18 between the bottom 17 and the valve 19. In branch pipe 20 is a desludging valve 21 provided with a switch mechanism 22 and a motor 23. A box 24 contains various electrical control devices to be described later.

The desludging valve 21 is illustrated in detail in Figs. 2 to 5. The valve has a body 30 with a sludge inlet 31, a sludge outlet 32, and a clean-out plug 33. Attached to the body 30 is a portplate 34 with an arcuate opening 35 communicating with sludge outlet 32. A rotor 36 with an arcuate cut-out section 37 is rotatable in contact with the port plate 34. A bonnet 38 is attached to body 30 by means of screws 39, forming a chamber 40 in which the rotor 36 is located and with which the sludge inlet 31 is in permanent communication. A spring 41, aided by the pressure of the sludge, serves to keep the rotor 36 firmly in contact with the port plate 34. A shaft 42 for the rotor 36 extends through stuffing box 43 in bonnet 38. The switch mechanism 22, mounted on bonnet 38, has a rotor 44 (see Figs. 6 and 7) operatively connected to shaft 42 so that, upon rotation of the shaft, the valve rotor 36 and the switch mechanism rotor 44 move in unison.

The motor 23, mounted on bonnet 38 by means of a bracket 45 drives through a coupling 46 and a worm (not shown) a worm gear 47 provided with ratchet teeth 48. The gear 47 is mounted on a shaft 49 in such manner that it is free to rotate on this shaft. Likewise, mounted on shaft 49, keyed to the shaft so as to rotate with it but free to move axially, is a clutch member 50 with ratchet teeth 51. A spring 52 exerts pressure against clutch member 50, tending to keep teeth 51 in mesh with teeth 48. Shaft 49 has its end 53 milled square so that a handle (not shown) may be attached for turning the shaft by hand. When that is done the teeth 51 slip out of engagement with teeth 48, and worm gear 47 stands still. When shaft 49 is rotated, either manually as described above, or by means of motor 23, through coupling 46, worm gear 47 and ratchet teeth 48 and 51, the shaft 42 is slowly rotated by the engagement of a worm 54 fixed to shaft 49 with a worm gear 55 fixed to shaft 42.

As shown in Figs. 4 and 5, the opening 35 and the cut-out section 37 extend through about 90 degrees. Thus, the desludging valve is wide open when the cut-out section 37 is in register with the opening 35. When the rotor 36 is within 90 degrees on either side from the position where the cut-out section is in register with the opening the valve is partly open, while through the remaining 180 degrees the valve is closed. Thus, upon turning the rotor 36 always in the same direction the desludging valve is alternately opened and closed.

The desludging valve is constructed of materials able to withstand the chemical action of the sludge. In limesoda softeners, for instance, where the sludge is of an alkaline nature, the valve may be made of iron or steel.

A wiring diagram for the apparatus illustrated in Fig. 1 is shown in Fig. 6. As has been explained above, the valve rotor 36 and the switch mechanism rotor 44 are rotated in unison. To facilitate understanding, the switch mechanism rotor 44 is shown developed in Fig. 6, and the corresponding positions of the desludging valve 21 have been marked.

Alternating current from a source (not shown) is supplied to wires 60 and 61 running through a magnetic switch 62 to motor 23. The magnetic switch 62 is arranged to be closed upon energization of its coil 63. The meter 12 alternately opens and closes a meter switch 64 every time a predetermined quantity of liquid has passed the meter, and each closing of the meter switch 64 energizes the coil 65 of a multipoint rotary switch 66 through a rectifier 67, the rotary switch being preferably operated by direct current. Each energization of the coil 65 moves the switch member 68 progressively from one contact point to the next. A time switch member 69 is arranged to be shifted alternately from a contact 70 to a contact 71 and back after predetermined numbers of revolutions of a constant speed motor 72, preferably of low voltage type and supplied with current through a transformer 73. A relay switch member 74 normally contacting a contact 77 is arranged to be shifted to contact 76 upon energization of its coil 75. The rotor 44 has contact strips 78, 79 and 80 successively contacted by a brush 81 upon rotation of the rotor in the direction of the arrow, strips 82 and 83 contacted by brush 84, and strip 85 contacted by brush 86. Brushes 81, 84 and 86 are connected to wire 61. Strip 78 is connected to switch member 68; strip 79 is connected to contact 70; strips 80 and 82 are connected through transformer 73 to wire 60; strip 83 is connected to contact 71; and strip 85 is connected with contact 76 and, through coil 75, with wire 60. One of the points of the rotary switch 66 is connected with the relay switch member 74, and the wire 60 is connected through coil 63 with the time switch member 69 and the relay switch contact 77.

The time switch 69 may advantageously be arranged for a five minute cycle and adjustable so that contact 71 is contacted for any desired portion of the five minutes, the other contact 70 being contacted for the remainder of each five minute period while motor 72 is running.

Fig. 6 shows the devices when the desludging valve 21 is closed and in readiness to initiate desludging.

Operation of the apparatus of Figs. 1 to 6 is as follows. Turbid liquid enters tank 10 through inlet 11 and meter 12. Sludge collects in the conical bottom 17, and clear liquid passes through uptake 13 to outlet 14. When the rate at which clear liquid is withdrawn from the tank 10 is different from that at which turbid liquid enters, the upper portion of tank 10 serves as a storage reservoir; the liquid level rises and falls as the supply exceeds or falls below the demand, respectively. In order to prevent overflowing of the tank the float switch 16 may be arranged in a known manner to stop the flow of incoming liquid when a given maximum level is reached, as by closing a power operated valve in pipe 11, or by stopping a pump supplying the turbid liquid to the apparatus.

In lime-soda softening as well as in many other processes the concentration of suspended matter in the turbid liquid is practically constant. Consequently, the flow recorded by the meter 12 is indicative of the quantity of sludge collected on the conical bottom 17. Every time a predetermined quantity of liquid has passed through inlet 11, which is to say every time a given quantity of sludge has accumulated in tank 10, the meter 12 closes the meter switch 64, energizing coil 65 and advancing the rotary switch member 68 one point. Advantageously, the meter switch 64 is closed at intervals in the order of one minute at normal flow through the apparatus. When switch member 68 reaches the contact point connected to relay switch member 74 a circuit is established from wire 60 through coil 63, contact 77, relay switch member 74, rotary switch member 68, strip 78 and brush 81 back to wire 61. Magnetic switch 62 closes and energizes the motor 23 which rotates until the circuit is broken and motor 23 de-energized with the desludging valve in wide open position when strip 78 passes out of contact with brush 81 which now contacts strip 79. Desludging is thus initiated. More frequent desludging may be provided by connecting 2 or more equally spaced contact points of the rotary switch 66 with the relay switch member 74, or by adding another bank of contacts and an interrupter to the rotary switch and connecting these elements to set up an automatic stepping circuit which causes the switch to pass over one or more contacts upon actuation by the meter switch.

Just prior to the stopping of motor 23 strip 82 has made contact with brush 84, closing a circuit from wire 60 through transformer 73, strip 82 and brush 84 to wire 61. Motor 72 is thus energized and after a predetermined number of revolutions, i. e. after the lapse of a predetermined interval of time, moves the time switch member from contact 71 to contact 70, whereby a circuit is established from wire 60 through coil 63, time switch member 69, contact 70, strip 79 and brush 81 to wire 61. The magnetic switch 62 closes and motor 23 operates until the last described circuit is broken with the valve in closed position and desludging terminated when strip 79 passes out of contact with brush 81. Brush 81 now contacts strip 80, brush 84 contacts strip 83, and brush 86 contacts strip 85, closing a circuit from wire 60 through coil 75, strip 85 and brush 86 to wire 61. Thereby the relay switch member 74 is moved from contact 77 to contact 76.

The constant speed motor 72, maintained in operation by a circuit from wire 60 through transformer 73, strip 80 and brush 81 to wire 61, operates and after a second predetermined number of revolutions moves the time switch member 69 from contact 70 back to contact 71. This establishes a circuit from wire 60 through coil 63, time switch member 69, contact 71, strip 83 and brush 84 to wire 61. Motor 23 is thereby energized and soon moves strip 80 out of contact with brush 81, thereby stopping motor 72; it then moves strip 78 in contact with brush 81 establishing a self-sustaining circuit (provided switch member 68 still contacts the point connected to relay switch member 74) from wire 60 through coil 75, contact 76, relay switch member 74, rotary switch 66, strip 78 and brush 81 to wire 61.

By keeping the relay switch member 74 out of contact with contact 77 the self-sustaining circuit prevents a repetition of desludging if the initiation switch 66 is still closed. If switch 66 has opened in the mean time the self-sustaining circuit does not come into play. This circuit thus makes impossible an immediate repetition of the desludging operation if not enough liquid happens to have passed through meter 12 since initiation of desludging to move rotary switch 66.

As soon as strip 83 passes out of contact with brush 84 motor 23 stops with the desludging valve still closed. At the same time strip 85 leaves brush 86. As soon as switch 66 moves, the self-sustaining circuit is interrupted and relay switch member 74 moves from contact 76 to contact 77, thus placing the apparatus in readiness to repeat the desludging operation when the initiation switch 66 again closes.

Figure 7:
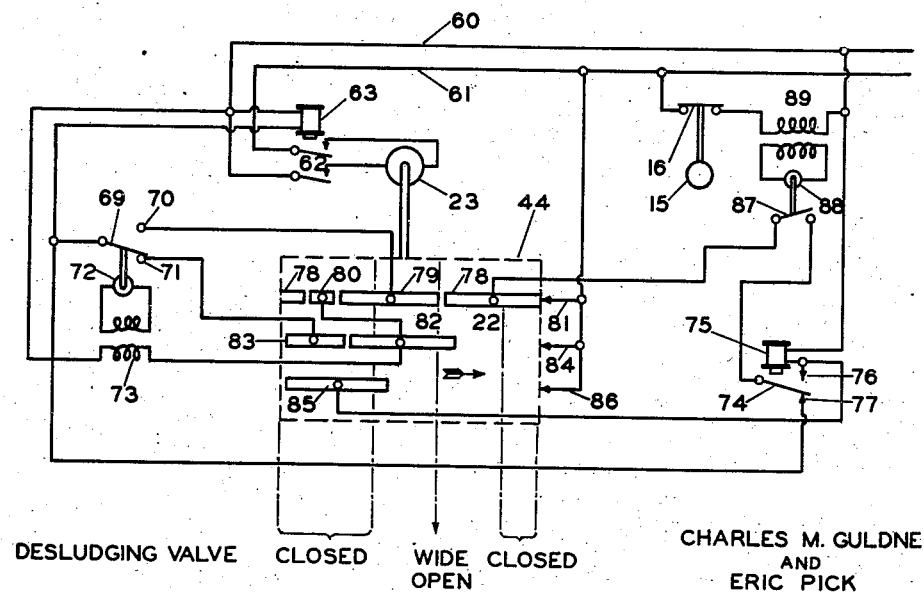
Fig. 7 is a modified wiring diagram for the same apparatus.

The modified wiring diagram shown in Fig. 7 is advantageous where the rate of flow of turbid liquid into tank 10 is constant. Here a time switch 87 is used to initiate desludging in place of the rotary switch 66 and meter switch 64 of Fig. 6. A constant speed, low voltage motor 88, supplied with current through transformer 89 and float switch 16, alternately opens and closes the time switch 87.

When time switch 87 is closed desludging is initiated by a circuit from wire 60 through coil 63, contact 77, relay switch member 74, time switch 87, strip 78 and brush 81 to wire 61. For the rest, operation is the same as described in connection with Fig. 6. Whenever the flow of liquid to tank 10 ceases the float 15 opens float switch 16 and stops the time switch motor 88 so that no desludging takes place during periods of no flow.

The advantages of our apparatus are that desludging is initiated and terminated under accurate control. Both the frequency and duration of desludging are adjustable so that the control can readily be set to meet varying operating conditions. In this manner sludge is never permitted to accumulate in the settling tank to such extent that it would interfere with efficient clarification, nor is any clarified liquid wasted in the desludging operation.

A further advantage of our apparatus is that desludging is carried out at shorter intervals and at lower rates of discharge than is practical with manual control. A high rate of desludging usually employed with manual control lowers the liquid level in the settling tank suddenly and, therefore, interferes with efficient clarification.

Modifications of the arrangement shown in the appended drawings without departing from the spirit of our invention will readily occur to those skilled in the art, and reference is, therefore, made to the claims for a definition of the scope of our invention.

We claim:

1. Improved means for automatically withdrawing sludge at spaced intervals comprising a sludge outlet adapted for connection to a tank containing turbid liquid, a valve adapted to be moved to positions to initiate and terminate flow of sludge through the sludge outlet, power means for moving said valve, an initiation switch adapted to energize the power means to move the valve to initiate flow of sludge, means for alternately closing and opening said initiation switch, a time switch adapted to energize the power means to move the valve to terminate flow of sludge, a motor to move the time switch, switch means arranged to energize the motor each time the valve is moved to initiate flow of sludge, and another switch for the power means in series with the initiation switch and arranged to be opened while the valve is being moved to terminate flow of sludge and to be closed by the opening of the initiation switch when the valve has been moved to terminate flow of sludge.

2. Improved means for automatically withdrawing sludge at spaced intervals comprising a sludge outlet adapted for connection to a tank containing turbid liquid, a valve adapted to initiate and terminate flow of sludge through the sludge outlet, power means for moving said valve, and electrical control means for the power means comprising an initiation switch, means for alternately moving said switch from open to closed position and vice versa, a switch mechanism arranged to be moved by the power means, a normally closed relay switch, a self-sustaining circuit for the relay switch, a magnetic switch for the power means, other electrical circuits including the power means and all said switches, and means in said switch mechanism for opening said relay switch and energizing said self-sustaining circuit, the initiation switch being arranged upon movement to open position to interrupt said self-sustaining circuit and thereby close the relay switch.

3. Improved means for automatically withdrawing sludge at spaced intervals comprising a desludging valve adapted for connection to a tank containing turbid liquid, electric power means for opening and closing said valve, a normally open magnetic switch adapted upon closing to energize the power means, an initiation switch adapted to energize the magnetic switch, a time switch adapted to energize the magnetic switch, a rotary switch mechanism operatively connected to the power means and adapted to de-energize the magnetic switch, a normally closed relay switch in series connection with the initiation switch, a self-sustaining circuit for the relay switch, and means in said switch mechanism for energizing said self-sustaining circuit and opening said relay switch, the initiation switch being arranged upon opening to interrupt the self-sustaining circuit and close the relay switch.

4. Improved means for automatically withdrawing sludge at spaced intervals comprising a valve having a sludge outlet, a flat port plate, an opening in the port plate in communication with said sludge outlet, a flat disc rotatable in contact with the port plate, a cut-out section in the disc adapted to be moved into and out of register with the opening upon rotation of the disc, and a shaft for the disc, power means for rotating the shaft, a magnetic switch adapted upon closing to energize the power means, an initiation switch arranged upon closing to energize the magnetic switch so as to cause the power means to rotate the disc until the cut-out section is in register with the opening, means for alternately closing and opening said initiation switch, a time switch adapted to energize the magnetic switch so as to cause the power means to rotate the disc until the cut-out section is out of register with the opening, a motor arranged to move the time switch to energize the magnetic switch after a predetermined number of revolutions of the motor, and switch means operatively connected to the shaft for energizing said motor each time said disc is rotated so that the cut-out section is in register with the opening.

5. Improved means for automatically withdrawing sludge from a tank at spaced intervals comprising a valve, a sludge outlet, a movable member in the valve adapted to be moved to positions to initiate and terminate flow of sludge, a switch mechanism, a movable member in said switch mechanism, a shaft arranged to move both said movable members in unison, power means for moving said shaft, an initiation switch adapted to energize the power means, means for alternately closing and opening the initiation switch, a time switch adapted to energize the power means, and a constant speed motor for moving the time switch, the initiation switch upon closing being arranged to energize the power means to move the movable valve member from a first position in which flow of sludge is terminated to a position to initiate flow of sludge, the movable switch mechanism member being arranged to deenergize the power means and to energize the constant speed motor when the movable valve member is in position to initiate flow of sludge, the constant speed motor being arranged after a predetermined number of revolutions to move the time switch to energize the power means to move the movable valve member to a second position in which flow of sludge is terminated, the movable switch mechanism member being arranged to deenergize the power means when the movable valve member is in said second position, the constant speed motor being arranged after a second predetermined number of revolutions to move the time switch to reenergize the power means to move the movable valve member back to the first position in which flow of sludge remains terminated, and the movable switch mechanism being arranged to deenergize both the power means and the constant speed motor when the movable valve member is in said first position.

6. Improved means for automatically withdrawing sludge from a tank at spaced intervals comprising a meter, a desludging valve, power means for opening and closing said valve, a normally open magnetic switch adapted upon closing to energize the power means, an initiation switch operated by the meter and adapted to energize the magnetic switch, a time switch adapted to energize the magnetic switch, a switch mechanism operatively connected to the power means and adapted to deenergize the magnetic switch, a normally closed relay switch in series connection with the initiation switch, a self-sustaining circuit for the relay switch, and means in said switch mechanism for energizing said self-sustaining circuit and opening said relay switch, the initiation switch being arranged upon opening to interrupt the self-sustaining circuit and close the relay switch.

7. In apparatus arranged to receive a flow of turbid liquid and having a settling tank and a sludge outlet for the tank, improved means for automatically withdrawing sludge from the tank at spaced intervals comprising a valve adapted to initiate and terminate flow of sludge through the sludge outlet, power means for moving said valve, a magnetic switch adapted upon closing to cause the power means to move the valve, an initiation switch adapted to energize the magnetic switch so as to cause the power means to move the valve to initiate flow of sludge, a constant speed motor for alternately closing and opening said initiation switch, a switch for said constant speed motor, means responsive to cessation of the flow of liquid to open said last named switch, a time switch adapted to energize the magnetic switch so as to cause the power means to move the valve to terminate flow of sludge, a motor arranged to move the time switch to energize the magnetic switch after a predetermined number of revolutions of the motor, switch means for energizing said motor, and means closing said switch means each time said valve is moved to initiate flow of sludge.

8. In apparatus arranged to receive a flow of turbid liquid and having a settling tank and a liquid storage, improved means for automatically withdrawing sludge from the tank at spaced intervals comprising a desludging valve, power means for opening and closing said valve, a normally open magnetic switch adapted upon closing to energize the power means, an initiation switch adapted to energize the magnetic switch, a constant speed motor for alternately closing and opening the initiation switch, a switch for said constant speed motor, a float in the liquid storage for actuating said last named switch, a time switch adapted to energize the magnetic switch, a switch mechanism operatively connected to the power means and adapted to de-energize the magnetic switch, a normally closed relay switch in series connection with the magnetic switch, a self-sustaining circuit for the relay switch, and means in said switch mechanism for energizing said self-sustaining circuit and opening said relay switch, the initiation switch being arranged upon opening to interrupt the self-sustaining circuit and close the relay switch.

CHARLES M. GULDNER, JR.
ERIC PICK.